United States Patent
Biswas et al.

(10) Patent No.: US 8,401,973 B1
(45) Date of Patent: Mar. 19, 2013

(54) METHOD AND SYSTEM FOR MANAGING A LICENSE FOR AN ADD-ON SOFTWARE COMPONENT

(75) Inventors: Sanjeev Kumar Biswas, Ghaziabad (IN); Akash Jain, Uttar Pradesh (IN); Kanika Dalmia Gupta, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 540 days.

(21) Appl. No.: 12/622,066

(22) Filed: Nov. 19, 2009

(51) Int. Cl.
*G06F 9/00* (2006.01)
*G06F 9/40* (2006.01)

(52) U.S. Cl. .......... 705/59; 715/749; 717/146; 717/147; 719/310

(58) Field of Classification Search ............. 705/59; 715/749; 717/146, 147; 719/310; 726/29
See application file for complete search history.

(56) References Cited

U.S. PATENT DOCUMENTS

| 7,099,818 | B1 * | 8/2006 | Nemecek et al. ............ 703/28 |
| 7,552,341 | B2 * | 6/2009 | Chen et al. ............... 713/187 |
| 8,060,855 | B2 * | 11/2011 | Hegde et al. ............... 717/103 |
| 2005/0229104 | A1 * | 10/2005 | Franco et al. .............. 715/743 |
| 2006/0059571 | A1 * | 3/2006 | Chen et al. ................ 726/29 |
| 2009/0037905 | A1 * | 2/2009 | Hamilton et al. ............... 718/1 |
| 2009/0182786 | A1 * | 7/2009 | Haanpaa et al. ............. 707/203 |

FOREIGN PATENT DOCUMENTS

| EP | 1 883 016 B1 * | 3/2009 |
| WO | WO03/036530 A1 * | 5/2003 |
| WO | WO2009/117638 A2 * | 9/2009 |

OTHER PUBLICATIONS

Rathlev ("Plug-ins: an Architectural Style for Component Software", Universitat Karlsruhe, Components in a World of Mobile and Distributed Computing: Proceedings of the thirteenth International Workshop on Component Oriented Programming, WCOP 2008, Oct. 13, 2008; pp. 5-10).*

* cited by examiner

*Primary Examiner* — James D Nigh
(74) *Attorney, Agent, or Firm* — Schwegman Lundberg Woessner P.A.

(57) ABSTRACT

Methods and systems for activating an add-on software component independently of any host application with which the add-on component is compatible are described. Consistent with some embodiments, an add-on manager module can be invoked from any host application that is part of a suite of applications. The add-on manager module displays a list of add-on components that are installed, and compatible with a particular host application. After receiving product activation data (e.g., serial number or product key) for a particular installed add-on component, a license verification operation is performed to validate the product activation data, and activate the add-on component for use with a host application.

15 Claims, 6 Drawing Sheets

METHOD AND SYSTEM FOR MANAGING A LICENSE FOR AN ADD-ON SOFTWARE COMPONENT

TECHNICAL FIELD

The present disclosure generally relates to End-user Licensing Agreements (EULA) and product activation tools. More specifically, the present disclosure relates to computer-based methods and systems for independently managing licenses for add-on software components and/or content.

BACKGROUND

To protect against unauthorized copying and use of software applications, many software vendors utilize some form of product activation procedure. In general, product activation (sometimes referred to as software activation) involves a procedure for verifying the authenticity of a software application, and ensuring that the software application is used within the scope of the End-User License Agreement (EULA). In a typical product activation procedure, a software application performs a hash operation to generate a hash of an identifier (ID) specific to a product's license (e.g., a product key) and a hardware serial number, identifying the particular computer or device on which the software application is to be utilized. The resulting hash, which is commonly referred to as an installation ID or a product activation ID, is then sent to a software vendor's license manager to verify the authenticity of the product key, and in some instances, to ensure that the product key is not being used simultaneously for multiple installations on multiple computers or devices. Of course, a variety of alternative product activation procedures exist. As described below, one problem with conventional license managers and product activation procedures is that they are designed to operate only with fully-executable, stand-alone software applications, and generally do not support add-on software components.

Many software applications are designed with a view to allowing additional functionality to be realized via one or more add-on software components. For example, web browser applications frequently utilize add-on components to enable the presentation or play back of various audio and video formats. Many video game applications utilize add-on components to provide additional content, such as advanced or customized levels of play, and/or special characters or background scenes. Certain graphics editing programs, such as Adobe Photoshop® from Adobe Systems Incorporated of San Jose, Calif., utilize add-on components to provide support for different graphics file formats, and to provide certain graphic and image processing functions. In some cases, certain add-on components are designed to operate with more than one application in a suite of applications. In many instances, add-on software components are not subject to EULA's and therefore no product activation procedure is necessary before an add-on software component can be utilized. However, because add-on software components are generally dependent upon a host application, in practice, the use of an add-on software component is typically dependent upon a host application being properly installed, licensed and activated.

For example, in FIG. 1, a functional block diagram of the modules involved in a conventional software activation scheme, used to enforce the EULA of a host application, is shown. In this example, the add-on software components are not subject to their own EULA. Instead, the use of the add-on software components is subject to a host application being properly installed, licensed and activated. Accordingly, each add-on software component will operate properly only if the individual host applications are properly installed, licensed and activated. In the example presented in FIG. 1, a license server 10 is shown to include a license manager module 12 and a database 14 of serial numbers and/or product keys. In addition, two applications and four add-on software components—applications A and B, and add-ons W, X, Y and Z—are shown to be installed on a network-connected computer 16. Each host application (e.g., applications A and B) is assigned its own serial number or product key, which is communicated in a licensing call 18 (e.g., at activation and/or execution time) from a client-side license module 20 to the license manager module 12 at the license server 10, where the serial number or product key is verified. Because the add-on software components are not individually licensed and the use of the add-on components is dependent only upon a host application being properly installed and activated, the software vendor has little control over how and when the add-on software components are utilized.

DESCRIPTION OF THE DRAWINGS

Some embodiments are illustrated by way of example and not limitation in the Figures of the accompanying drawings, in which.

DETAILED DESCRIPTION

Methods and systems for activating an add-on software component independently of the host application with which it is used are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

As used herein, the term "add-on software component" or "add-on component" is a set of instructions or data that are compatible with one or more host applications to provide a certain function or functions that extend the functionality or usefulness of a host application. For purposes of the present disclosure, the terms "add-on software component" and "add-on component" are interchangeable and are meant to encompass add-ins, plug-ins, snap-ins and extensions. In general, an add-on component is dependent upon a host application to operate and therefore an add-on component may or may not have its own user interface. For purposes of the present disclosure, a host application is a stand-alone software application that is designed to operate with one or more add-on components, but may also operate independently, with no add-on software components.

Consistent with some embodiments of the invention, an add-on software component that may be compatible with one or more host applications is assigned its own serial number or product key and can therefore be activated independently of any host application with which it might be compatible. The activation process may occur when the add-on software component is first invoked or executed, or alternatively, when an end-user invokes an add-on management module via one of the compatible host applications. In some embodiments, activating an add-on software component will automatically make the add-on software component operable with any compatible host application. However, in alternative embodiments, activating the add-on software component will only make it operable with a particular host application. Accordingly, consistent with some embodiments of the invention, the activation process enables the enforcement of EULA's with varying licensing terms, and so forth.

Figure 1:
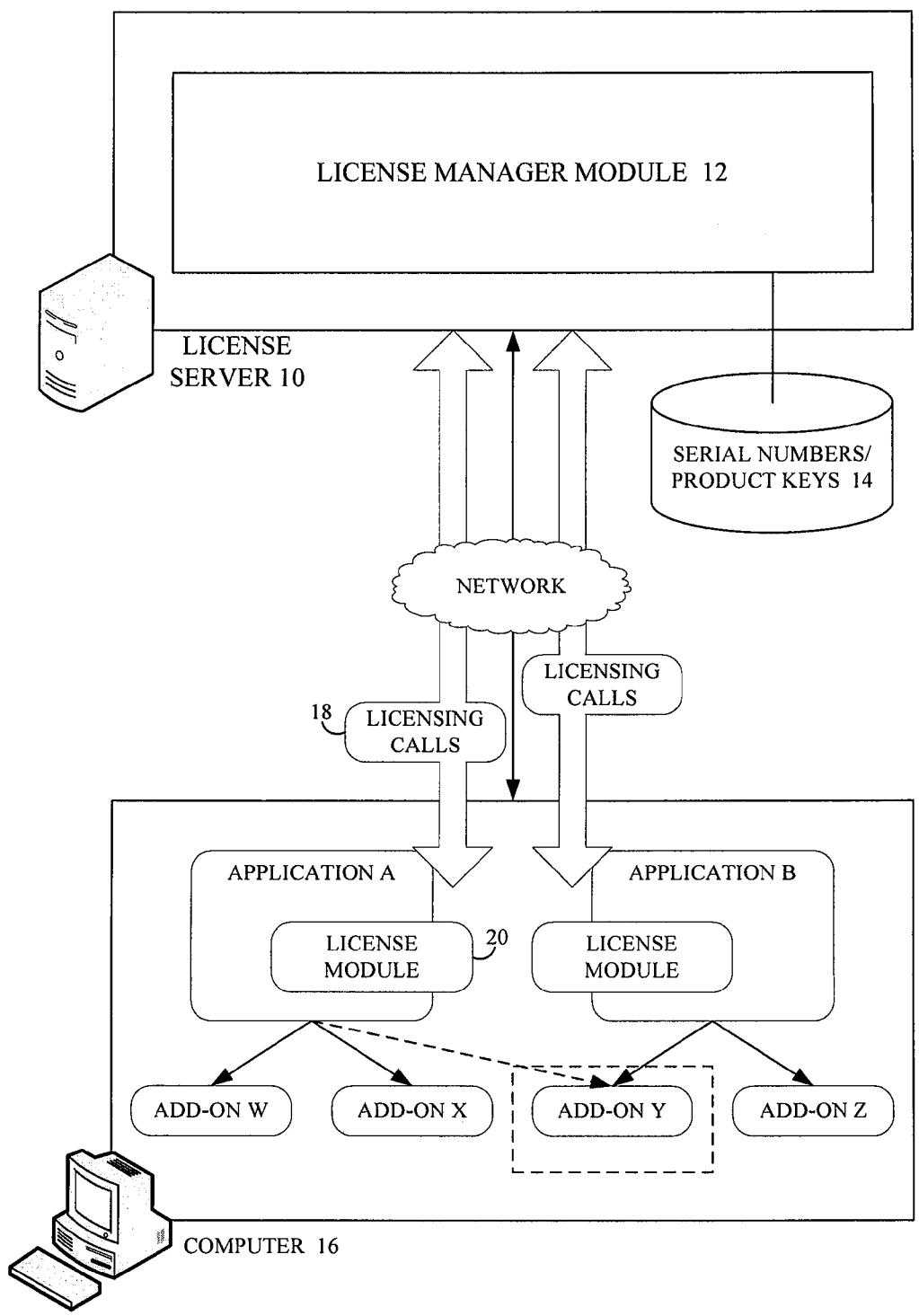
FIG. 1 illustrates a functional block diagram of the modules involved in a conventional product activation scheme in which add-on software components are not subject to an independent End-User Licensing Agreement.
Figure 2:
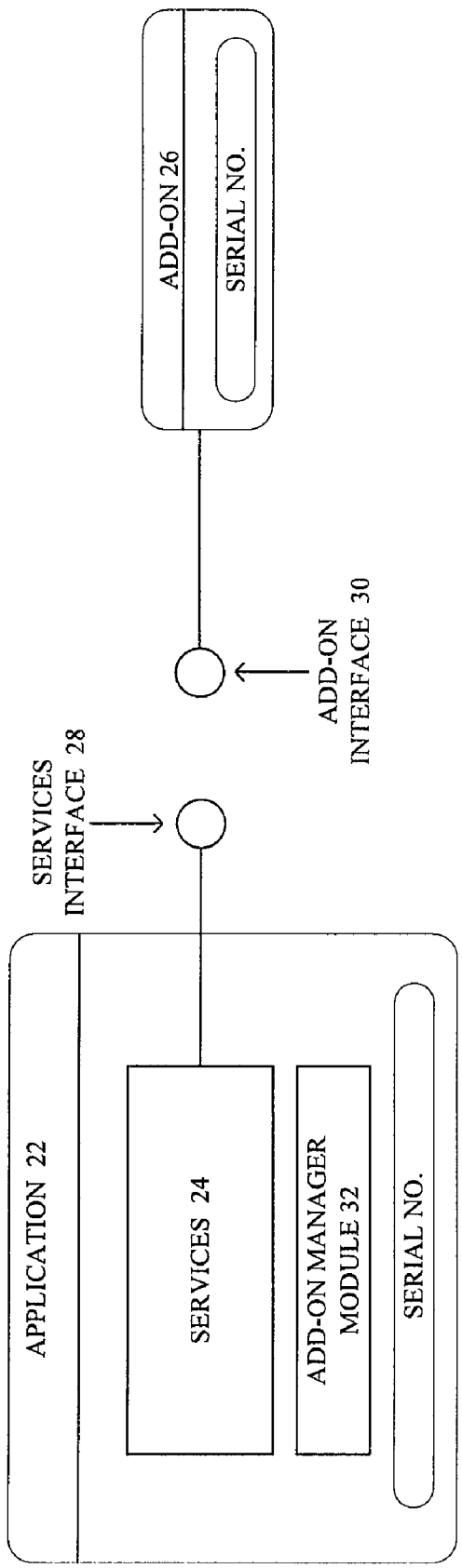
FIG. 2 illustrates a functional block diagram of a software architecture in which a software application is intended to operate with one or more add-on software components, according to an embodiment of the invention.

FIG. 2 illustrates a functional block diagram of a software architecture in which a software application is intended to operate with one or more add-on software components, according to an embodiment of the invention. As illustrated in FIG. 2, the host software application 22 has a set of defined services 24 that can be invoked by the add-on software component 26. In particular, the services 24 are associated with a services interface 28, which corresponds with an add-on interface 30. In some embodiments, this interface-pair may represent an application programming interface (API) having functions or methods that can be invoked by API calls. In some embodiments, the API calls may be open (e.g., publicly available and/or non-proprietary), such that any third-party application developer can develop an add-on component compatible with the host application 22. In some embodiments, the interface-pair may be associated with or represent a data exchange protocol through which data can be communicated between the host application 22 and the add-on component 26. In general, the add-on component is dependent upon the services 24 of the host application and cannot operate independently. Conversely, the host application 22 is capable of operating independently, without any add-on software components. Accordingly, end-users can dynamically update, add and remove add-on software components, without needing to make any changes to the host application 22. In some embodiments, add-on components may provide certain advantages, including: enabling third-party developers to extend the functionality of a host application; providing support for features and functionality that are not yet known or implemented; reducing the size of a host application; and separating host application source code from add-on source code because of incompatible software licenses.

As illustrated in FIG. 2, the host application 22 includes an add-on manager module 32 that provides a way for the add-on component 26 to register with, or otherwise make itself known to, the host application 22. Although in FIG. 2 the add-on manager module 30 is shown to be a part of the host application 22, in some alternative embodiments, the add-on manager module 32 may be a separate and independent component, and may map several add-on components to the host applications with which the add-on components are compatible. Accordingly, the add-on manager module 30 may indicate when a single add-on component is compatible with multiple host applications. Also, as described in greater detail below, the add-on manager module 32 may include a license module (not shown in FIG. 2) that performs various product activation operations that facilitate enforcement of EULA associated with add-on software components.

In the example presented in FIG. 2, the host application 22 and the add-on software component 26 both have their own serial number. Accordingly, consistent with some embodiments of the invention, the host application 22 and the add-on software component 26 can be made subject to separate and independent EULA's, and can be separately and independently activated, for example, by a software activation process.

Skilled artisans will readily appreciate that the software architecture represented in FIG. 2 represents a single example of a vast number of potential architecture implementations. In particular, in some embodiments, the add-on component 26 may represent content that is non-executable data, such as a theme or skin that includes graphics, images, and/or audio content. In such a scenario, the add-on component may not have an add-on interface 30 that invokes services 24, but instead, the services 24 will read and process data included in the add-on component. As such, the data of the add-on component may be structured in a particular way to suit the requirements of the host application.

Figure 3:
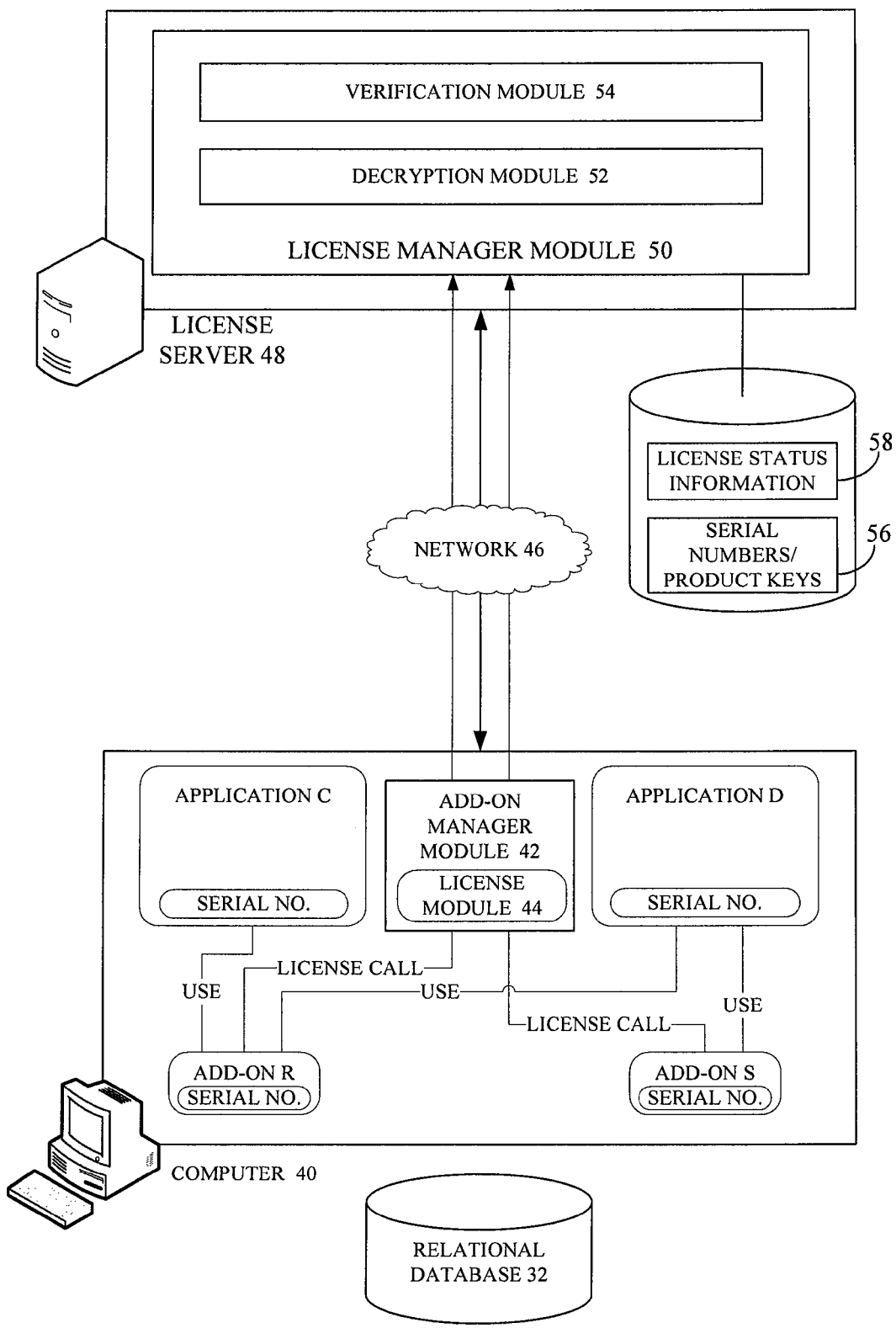
FIG. 3 illustrates a functional block diagram of the modules involved in a product activation scheme in which each add-on software component is individually serialized and licensed, according to an embodiment of the invention.

FIG. 3 illustrates a functional block diagram of the modules involved in a product activation scheme in which each add-on software component is individually serialized, licensed and activated, according to an embodiment of the invention. As illustrated in FIG. 3, two stand-alone host applications (e.g., Application C and Application D) are shown to reside on the computer with reference number 40. In addition, two add-on software components (e.g., add-on R and add-on S) are shown to reside on the computer 40. In this example, add-on component R is compatible with both Application C and Application D, while add-on component S is only compatible with Application D.

According to some embodiments, when a host application is first installed, one or more add-on software components may be installed along with the host application. For example, in some instances a suite of applications may be installed on a computer, and along with the applications, one or more add-on components will also be installed. Some of the add-on components may provide additional functionality or otherwise enhance a single host application, while other add-on components may be compatible with multiple host applications. As part of the installation process, or when an add-on component is first invoked or executed, an add-on manager module 42 may be invoked. Alternatively, the add-on manager module 42 may be invoked at a later time, when an end-user interacts with a particular user interface element (e.g., a menu item or button) of the host application, such that the UI element invokes the add-on manager module 42. In either case, the add-on manager module 42 may identify the installed add-on components with which the host application is compatible. Accordingly, in some embodiments when a host application is first installed, an end-user may be presented with a user interface that identifies add-on software components that are compatible with the host application. In addition, the end-user may be presented with an opportunity to provide product activation data, such as licensing information (e.g., a product key or serial number), to activate an installed add-on software component.

As illustrated in FIG. 3, the add-on manager module 42 is a separate and independent module. Accordingly the add-on manager module 42, in some embodiments, may be invoked from any host application in a suite of applications, including host Applications C and D in the example presented in FIG. 3. In some embodiments, the add-on manager module 42 will include a user interface component that presents information that identifies the add-on software components compatible with the host application that invoked the add-on manager module 42. For example, if the add-on manager module 42 was invoked by Application C, only information about add-on R would be displayed to the end-user, because only add-on R is compatible with Application C in the example presented in FIG. 3. In some embodiments, the add-on manager module 42 may be a stand-alone application that can be independently invoked. In such a scenario the add-on manager module 42 may present information about multiple host applications and add-on software components. For example, in some embodiments, the add-on manager module 42 may present information that identifies the host applications that are compatible with the individual installed add-on components, as well as the status of each add-on component. The status information may include whether the add-on component is currently activated (e.g., indicating a valid license has been verified), or installed but not yet activated. Additionally, the status information may include information about a trial period associated with a limited license. Such information may indicate the number of days left in the trial period, for example. An example user interface of the add-on manager module 42 is presented in FIG. 4.

In some embodiments, the add-on manager module 42 includes a license module 44. The license module 44 facilitates communications over a network between the add-on manager module 42 and a license server 48. For example, in some embodiments, the license module 44 may make various types of license calls to a license manager module 50 residing and executing at the license server 48. One type of license call involves a call to request that a product be activated. For example, based on some end-user supplied input, such as a product key or serial number, a product activation ID may be generated and communicated in a license call to the license manager module 50 to verify that an installation of an add-on component is authorized under a particular EULA associated with the add-on component. In some embodiments, some form of machine ID may also be communicated in a license call, so that the activated add-on component is associated with a particular machine, as identified by the machine ID.

At the license manager module 50, a decryption module 52 may decrypt the product activation code received in the license call, while a verification module 54 verifies the authenticity of the end-user supplied serial number of product key, for example, by comparing the end-user supplied serial number or product key with a known serial number or product key 56 stored in a database. When first activated, the machine ID may be stored with the licensing information to associated the activation of the add-on component with the particular machine.

Additionally, a separate license call may be made to confirm the licensing status of one or more existing and installed add-on components. For example, when a host application invokes a particular add-on component, while the add-on component is executing, a background process may be performed to verify that the status of the license for the add-on software component has not changed. The status information 58, in this scenario, may be maintained at the license manager module 50. The status information is communicated back to the add-on manager module, which displays the status information in a user interface.

Figure 4:
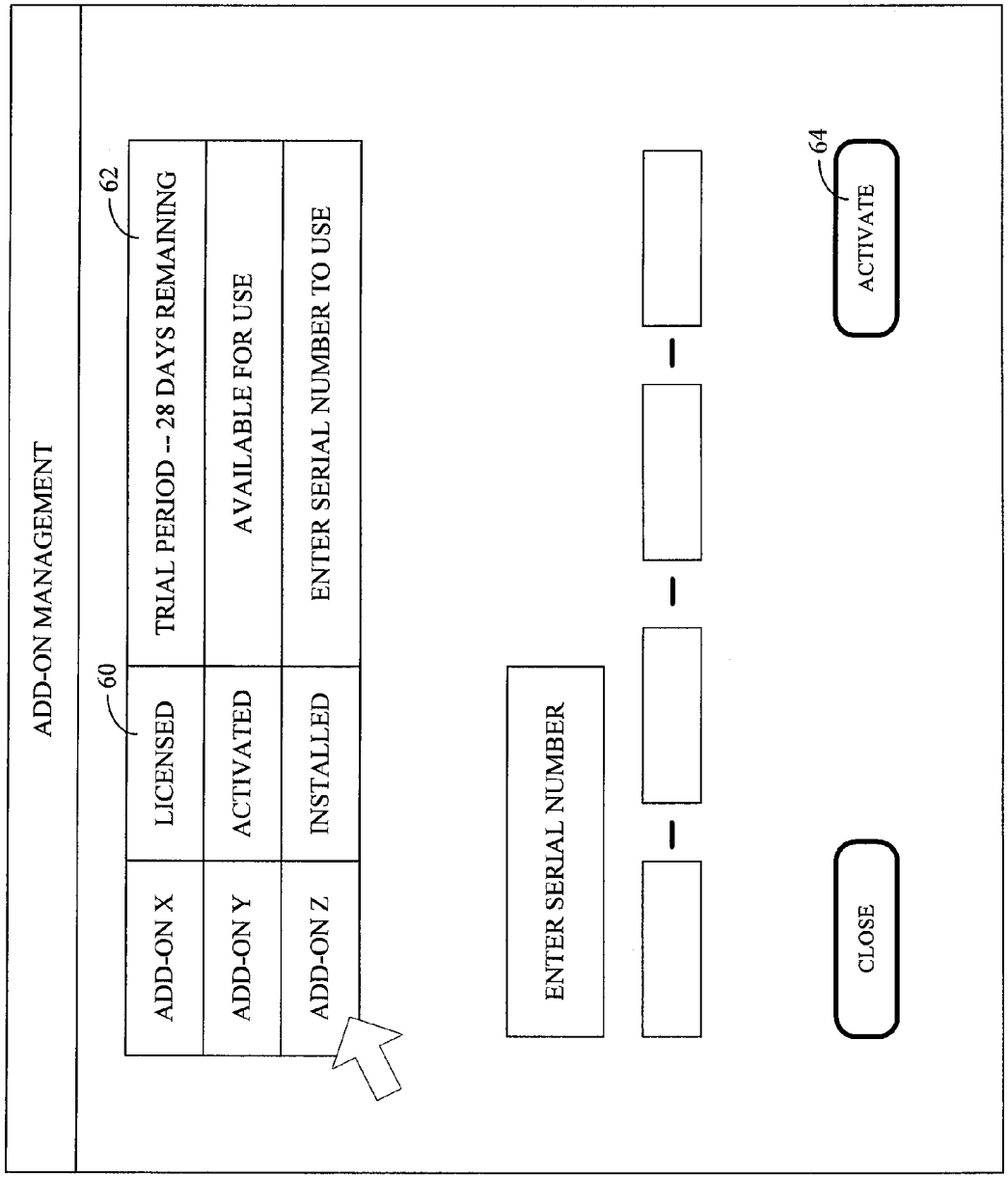
FIG. 4 illustrates an example graphical user interface associated with a product activation scheme in which add-on software components are individually serialized and licensed, according to an embodiment of the invention.

FIG. 4 illustrates an example graphical user interface associated with a product activation scheme in which add-on software components are individually serialized and licensed, according to an embodiment of the invention. In some embodiments, the user interface illustrated in FIG. 4 may be associated with an add-on manager module, and may be presented as part of an installation process. For example, the user interface may be presented during, or immediately subsequent to, the installation of a host application or the installation of an add-on software component. Alternatively, in some embodiments, a user interface of a host application may provide a mechanism (e.g., a menu item or button) that operates to invoke an add-on manager module, which in turn presents a user interface such as that displayed in FIG. 4. Accordingly, in some embodiments, the add-on manager module may be integrated with the host application, while in other embodiments, the add-on manager module may be a separate entity that is callable by any number of host applications included in a suite of applications.

In some embodiments, when the add-on manager module is invoked from within a particular host application, the user interface of the add-on manger module will show a list of only those add-on software components that are presently installed and compatible with the particular host application that invoked the add-on manager module. For example, in FIG. 4, the add-on components (add-ons X, Y and Z) are all presumed to be compatible with the same host application. As illustrated in FIG. 4, for each add-on component shown, a status is also indicated. For example, the status of add-on X in FIG. 4 is indicated as "Licensed" 60. In addition, further information is provided about the "Licensed" status. For instance, the additional information 62 for add-on X indicates that the license is a limited license associated with a trial period in which 28 days are remaining.

In addition to presenting status information, the user interface of FIG. 4 facilitates the collecting of licensing information for an add-on software component. For example, by selecting add-on Z (as shown), an end-user is prompted to enter a serial number associated with add-on Z. After providing the serial number, an end-user can select the activate button 64 to initiate a license call to a license server. Assuming a proper serial number is provided, the status of add-on Z will be changed to reflect its new status.

Figure 5:
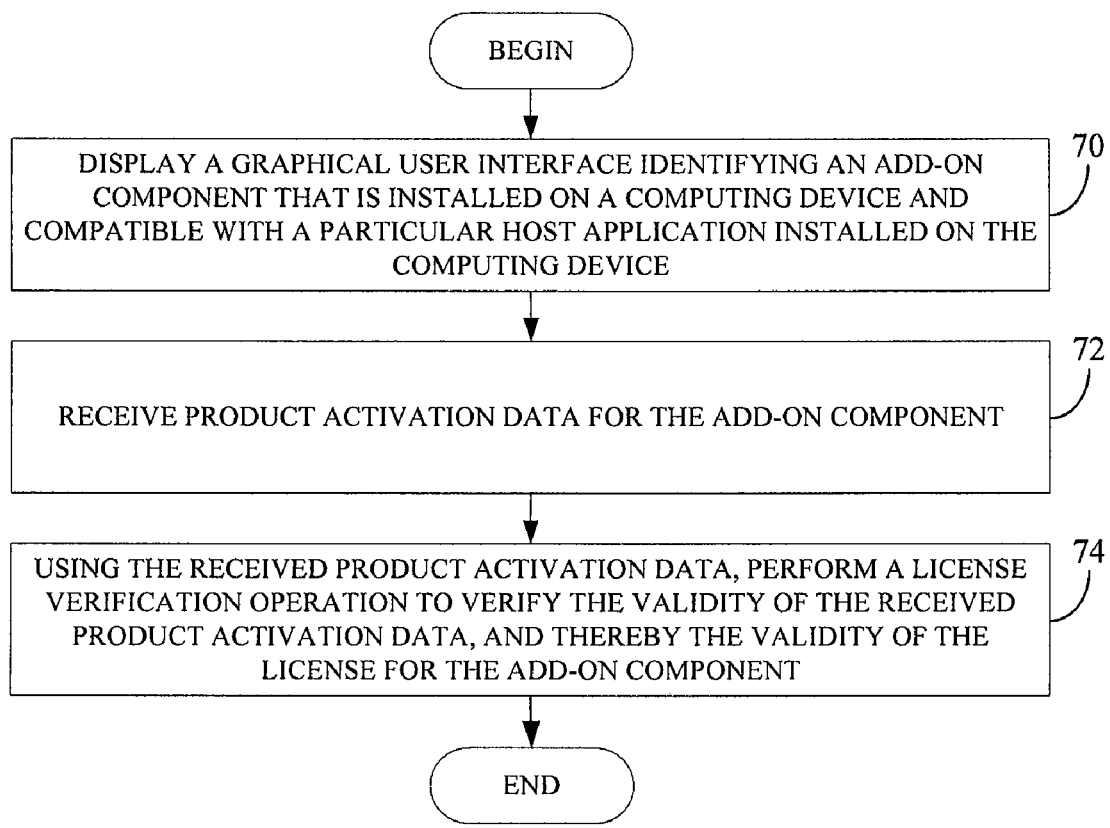
FIG. 5 illustrates a method, according to an embodiment of the invention, for activating an add-on software component for use with a host application, upon verifying a license associated with the add-on software component, according to an embodiment of the invention.
Figure 6:
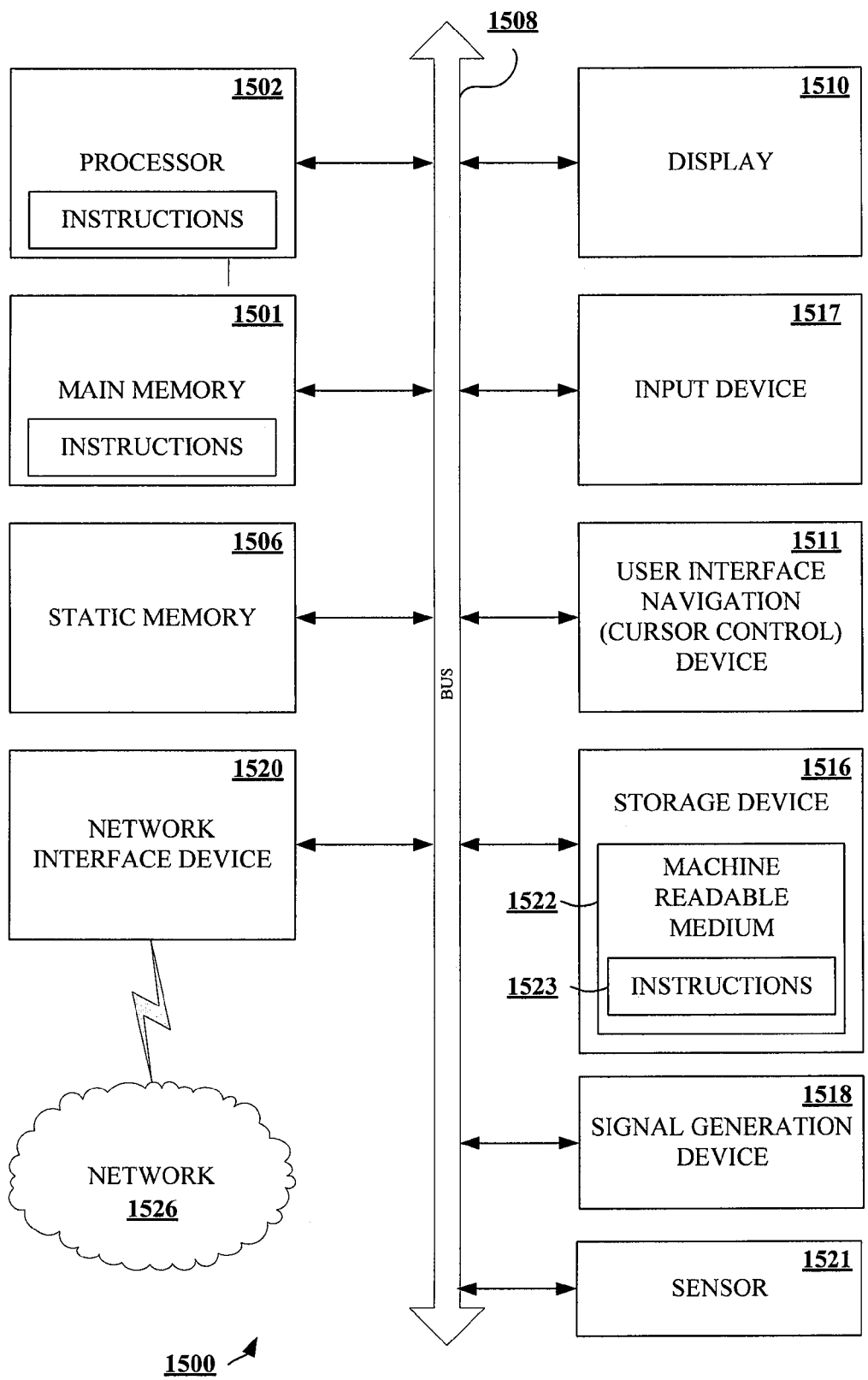
FIG. 6 is a block diagram of a machine in the form of a computer system within which a set of instructions, for causing the machine to perform any one or more of the methodologies discussed herein, may be executed.

FIG. 5 illustrates a method, according to an embodiment of the invention, for activating an add-on software component for use with a host application, upon verifying a license associated with the add-on software component, according to an embodiment of the invention. The activation process for the add-on component may be invoked automatically when the add-on component is first invoked or executed via the host application. For example, when a user attempts to use the add-on component for the first time via the host application, the activation process is initiated. Alternatively, the software activation process for the add-on component may be manually invoked via a host application. For example, in some embodiments, the software activation process might be invoked by selecting a UI element (e.g., button or menu item) from any one of several applications included in a suite of applications. Once invoked, at method operation 70, a user interface is presented. The user interface identifies (e.g., displays) the add-on software components that are installed and compatible with the host application that invoked the software activation method. In some embodiments, the software activation process may be a stand-alone process that can be independently invoked of any particular host application. In such a scenario, the user interface may display all add-on software components installed, and indicate the host applications with which each add-on component is compatible.

At method operation 72, product activation data is received for an add-on component. For example, a user may be prompted to enter a serial number or product key for an installed, but not yet activated, add-on component. The add-on component for which the product activation data is received may be compatible with one or more host applications in a suite of applications.

Next, at method operation 74, the product activation data is communicated to a license server in a license verification call, to verify the validity of the product activation data, and by proxy, the license associated with the installed add-on component. If the license verification operation establishes that the product activation data is valid, the status of the add-on component is changed to reflect the approval.

Once an add-on component is activated, periodically as the add-on component is used, a background process may assess whether the status of the license has changed. For example, if the license for the add-on component is a limited license and subject to a trial period, when the trial period ends, the status of the add-on component will change and further action will be required to continue using the add-on component.

Because the add-on software component is activated independently of any host application with which the add-on software component may be compatible, the add-on software component may be activated with a licensing status that is different from any one or more host applications with which the add-on software component is compatible. For example, the license for the add-on component may be a limited license, providing a trial period for using the add-on software component, whereas the host application may have a regular, unlimited license. Of course, other variations of licensing statuses may be possible.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

FIG. 5 is a block diagram of a machine in the form of a computer or processing system within which a set of instructions, for causing the machine to perform any one or more of the methodologies discussed herein, may be executed. For example, the machine may perform the activation process for activating an add-on software component for use with a host application, as illustrated in FIG. 5. Similarly, the machine may perform one or more operations associated with the license manager module. In some embodiments, the machine operates as a stand-alone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

By licensing add-on components independently of the host applications with which the add-on components are compatible, host applications and add-on components can be priced to more accurately reflect the value of the applications to the user, or the cost to the developer associated with development, of the respective host application or add-on component. For example, in certain scenarios, advanced functionality of a host application that is used by a limited number of application users can be offered independently as an add-on component. This may results in a less expensive host application, as the host application can be sold without the add-on component comprising the advanced functionality. Consequently, in general, the licensing and software activation methods described herein provide for much more flexible pricing strategies.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A method, comprising:
    displaying a graphical user interface i) identifying an add-on software component and a licensing status for the add-on software component, the add-on software component installed on a computing device and compatible with more than one host application in a suite of host applications installed on the computing device;
    receiving product activation data for the add-on software component;
    determining, at a processor-implemented add-on manager module, the host applications in the suite of host applications with which the add-on software component is compatible;
    performing, at a processor-implemented license manager module, a license activation operation to verify the received product activation data and the validity of the installed add-on software component, the activation operation performed for the add-on software component independent of any activation operation performed for any host application in the suite of host applications, and if successful, the license activation operation activates the add-on software component for use with any one of the host applications in the suite of host applications with which the add-on software component is compatible.

2. The computer-implemented method of claim 1, wherein each host application in the suite of host applications with which the add-on software component is compatible has been assigned its own product activation data that is verifiable via a separate license activation operation.

3. The computer-implemented method of claim 1, wherein the displaying the graphical user interface occurs subsequent to, and as a result of, invoking the add-on software component for the first time from the host application.

4. The computer-implemented method of claim 1, wherein the displaying the graphical user interface occurs subsequent to, and as a result of, receiving input via a graphical user interface of the host application, the input invoking an add-on manager module that displays the graphical user interface identifying the add-on software component and the licensing status for the add-on software component.

5. The computer-implemented method of claim 1, further comprising:
    prior to receiving the product activation data for the add-on software component, receiving input indicating selection of the add-on software component, and prompting for the product activation data for the add-on software component.

6. The computer-implemented method of claim 1, further comprising enabling use of the add-on software component with all compatible host applications in the suite of host applications installed on the computing device when the license activation operation indicates the product activation data is valid.

7. The computer-implemented method of claim 1, further comprising preventing use of the add-on software component with all compatible host applications in the suite of host applications installed on the computing device when the license activation operation indicates the product activation data is not valid.

8. The computer-implemented method of claim 1, wherein the performing a license activation operation to verify validity of the received product activation data for the installed add-on software component includes making a license call to a license manager module residing and executing on a remote server, the licensing call including the product activation data.

9. The method of claim 8, wherein a machine identifier is included in the licensing call to the license manager module, the machine identifier identifying the machine on which the host application and the add-on software component are installed.

10. The method of claim 8, wherein the license activation operation for the add-on software component results in activating the add-on software component with a licensing status that is different from a licensing status of a host application with which the add-on software component is compatible.

11. A processing system, comprising:
    at least one processor; and
    a non-transitory machine-readable medium in communication with the at least one processor, the machine readable medium storing an add-on manager module that is executable by the at least one processor, the add-on manager module being executable by the at least one processor to cause operations to be performed, the operations comprising:

displaying a graphical user interface identifying an add-on software component and a licensing status for the add-on software component, the add-on software component installed on the processing system and compatible with more than one host application in a suite of host applications installed on the processing system;

receiving product activation data for the add-on software component; and determining the host applications in the suite of host applications with which the add-on software component is compatible; and performing a license activation operation to verify the received product activation data and the validity of the installed add-on software component, the activation operation performed for the add-on software component independent of any activation operation performed for any host application in the suite of host applications, and if successful, the license activation operation activates the add-on software component for use with any one of the host applications in the suite of host applications with which the add-on software component is compatible.

12. The processing system of claim 11, wherein each host application with which the add-on software component is compatible is assigned its own product activation data that is verifiable via a separate license activation operation.

13. The processing system of claim 11, wherein the displaying the graphical user interface occurs subsequent to, and as a result of, invoking the add-on software component for the first time from the host application.

14. The processing system of claim 11, further comprising enabling use of the add-on software component with all compatible host applications in the suite of host applications installed on the computing device when the license activation operation indicates the product activation data is valid.

15. The processing system of 11, wherein the license activation operation for the add-on software component results in activating the add-on software component with a licensing status that is different from a licensing status of a host application with which the add-on software component is compatible.

\* \* \* \* \*